(12) United States Patent
Douskey et al.

(10) Patent No.: US 10,067,183 B2
(45) Date of Patent: Sep. 4, 2018

(54) PORTION ISOLATION ARCHITECTURE FOR CHIP ISOLATION TEST

(71) Applicant: INTERNATIONAL BUSINESS MACHINES CORPORATION, Armonk, NY (US)

(72) Inventors: Steven M. Douskey, Rochester, MN (US); Raghu G. Gaurav, Bangalore (IN); Mary P. Kusko, Hopewell Junction, NY (US); Hari K. Rajeev, Kerala (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/188,122

(22) Filed: Jun. 21, 2016

(65) Prior Publication Data
US 2017/0363683 A1  Dec. 21, 2017

(51) Int. Cl.
*G01R 31/317* (2006.01)
*G01R 31/3177* (2006.01)

(52) U.S. Cl.
CPC ... *G01R 31/31704* (2013.01); *G01R 31/3177* (2013.01); *G01R 31/31722* (2013.01)

(58) Field of Classification Search
CPC .............................................. G01R 31/31704
See application file for complete search history.

(56) References Cited

U.S. PATENT DOCUMENTS

| 5,452,239 A | * | 9/1995 | Dai | G06F 17/5027 703/19 |
| 5,703,789 A | * | 12/1997 | Beausang | G01R 31/31716 716/103 |
| 5,903,466 A | * | 5/1999 | Beausang | G01R 31/31704 716/104 |
| 5,949,692 A | * | 9/1999 | Beausang | G01R 31/318536 703/15 |

(Continued)

OTHER PUBLICATIONS

Patel et al., "Method and Apparatus to Design and Physically Optimize Scan Wrapper for SOC DFT", IPCOM000007717D, IP.com, Apr. 16, 2002, pp. 1-10.

*Primary Examiner* — Joseph D Torres
(74) *Attorney, Agent, or Firm* — Cantor Colburn LLP; Steven Meyers (57) ABSTRACT

Embodiments include methods, and processing system, and computer program products providing portion isolation design to a chip design to facilitate partial-good portion isolation test of the chip. Aspects include: retrieving a chip design file of a chip, the chip design file having pin related information from a chip design database, generating, via a pin group utility module, a pin group file according to the pin related information retrieved, combining, via a portion wrapper insertion utility module, the pin group file with one or more portion netlists to form one or more localized portion wrapper segments, stitching, via the portion wrapper insertion utility module, the one or more localized portion wrapper segments to form a portion boundary wrapper chain, and inserting, via the portion wrapper insertion utility module, the portion boundary wrapper chain into the chip design file to facilitate partial-good portion isolation test.

13 Claims, 4 Drawing Sheets

(56) References Cited

U.S. PATENT DOCUMENTS

| | | | |
|---|---|---|---|
| 6,141,790 A * | 10/2000 | Beausang | G01R 31/318591 |
| | | | 703/16 |
| 6,405,355 B1 * | 6/2002 | Duggirala | G01R 31/318536 |
| | | | 716/122 |
| 6,425,109 B1 | 7/2002 | Choukalos et al. | |
| 6,456,961 B1 | 9/2002 | Patil et al. | |
| 6,675,364 B1 * | 1/2004 | Basto | G01R 31/318342 |
| | | | 716/108 |
| 6,934,897 B2 | 8/2005 | Mukherjee et al. | |
| 7,024,660 B2 | 4/2006 | Andrade et al. | |
| 7,155,693 B1 * | 12/2006 | Rodman | G06F 17/5072 |
| | | | 716/122 |
| 8,302,065 B2 | 10/2012 | Shomrony et al. | |
| 2003/0149949 A1 * | 8/2003 | Price | G06F 17/5022 |
| | | | 716/106 |
| 2004/0254755 A1 * | 12/2004 | Byrn | G01R 31/31718 |
| | | | 702/117 |
| 2006/0156142 A1 * | 7/2006 | Gabrielson | G01R 31/31704 |
| | | | 714/742 |
| 2006/0271904 A1 * | 11/2006 | Emerson | G01R 31/31704 |
| | | | 716/111 |
| 2009/0291533 A1 * | 11/2009 | Ebbers | G06F 17/5045 |
| | | | 438/128 |
| 2009/0292828 A1 * | 11/2009 | Ebbers | G06F 15/7807 |
| | | | 710/9 |
| 2010/0031209 A1 * | 2/2010 | Luan | G06F 17/5031 |
| | | | 716/113 |
| 2015/0019929 A1 | 1/2015 | Swoboda | |

* cited by examiner

PORTION ISOLATION ARCHITECTURE FOR CHIP ISOLATION TEST

BACKGROUND

The present disclosure relates generally to chip manufacturing, and more particularly to methods, systems and computer program products of providing portion isolation design to a chip design to facilitate partial-good portion isolation test of a chip.

The rapid densification of very-large-scale integration (VLSI) devices, incorporating complex functions operating at extreme circuit performance, has driven the designs towards integrating many diverse functional macros or cores within these large chips. These macros range from autonomous processor cores with large cache arrays occupying relatively large portions of the chip's real estate, to a multitude of small arrays used as register stacks, trace arrays, content addressable memories, phase locked loops (PLLs), and many other special purpose logic functions. In conjunction with these higher integration densities and larger devices, current system architecture is shifting, in many applications, toward massively parallel processing utilizing multiple copies of these integrated cores. The number of processing cores can range from dual-cores to hundreds of cores per chip in the near future and to thousands of core arrays at system level. The independent logic units such as register stacks, trace arrays, content addressable memories, PLLs, as well as the cores in a processor are called "portions" of a chip here.

These highly integrated circuit functions, in conjunction with state-of-the-art semiconductor technology advances, usually result in relatively low device yields because even if one of the many portions of a chip is defective, then the entire chip is considered as defective. A further enhancement to the overall yield is to utilize partially "good" devices or devices that function acceptably with some defective portions.

The scenario outlined above surfaces several test and diagnostic problems that have driven the design and integration of many test functions within the same semiconductor devices.

Hierarchical Test and Partial Good Test testing needs portion wrapping to isolate one or more portion netlist from the logic outside its logical hierarchy. The wrapper resides at the boundary of the core and provides a way to test the portions of the semiconductor devices in isolation and also the interconnection between the various portions at its Top Level.

Therefore, heretofore unaddressed needs still exist in the art to address the aforementioned deficiencies and inadequacies.

SUMMARY

In one aspect, the present disclosure relates to a method of providing portion isolation design to a chip design having a predetermined number of portions. In certain embodiments, the method may include: retrieving a chip design file of a chip, the chip design file having pin related information from a chip design database, generating, via a pin group utility module, a pin group file according to the pin related information retrieved, combining, via a portion wrapper insertion utility module, the pin group file with one or more portion netlists to form one or more localized portion wrapper segments, stitching, via the portion wrapper insertion utility module, the one or more localized portion wrapper segments to form a portion boundary wrapper chain, and inserting, via the portion wrapper insertion utility module, the portion boundary wrapper chain into the chip design file to facilitate partial-good portion isolation test of the chip.

In another aspect, the present disclosure relates to a computer system of providing portion isolation design to a chip design having a plurality of portions. In certain embodiments, the computer system may include: a processor, and a memory storing computer executable instructions. In certain embodiments, the computer executable instructions may include: a pin group utility module and a portion wrapper insertion utility module. The pin group utility module groups a predetermined number of pins of a chip into certain number of pin groups and generates a pin group file based on the pin groups. The portion wrapper insertion utility module creates a portion boundary wrapper chain and inserts the portion boundary wrapper chain created into the chip design file of the chip to facilitate partial-good portion isolation test of the chip.

In yet another aspect, the present disclosure relates to a computer program product operable on a computer system of providing portion isolation design to a chip design having a predetermined number of portions. The computer program product may include a non-transitory computer storage medium readable by the computer system having a processor and a memory configured to store computer executable instructions for execution by the processor of the computer system for performing a method. The method may include: retrieving a chip design file of a chip, the chip design file having pin related information from a chip design database, generating, via a pin group utility module, a pin group file according to the pin related information retrieved, combining, via a portion wrapper insertion utility module, the pin group file with one or more portion netlists to form one or more localized portion wrapper segments, stitching, via the portion wrapper insertion utility module, the one or more localized portion wrapper segments to form a portion boundary wrapper chain, and inserting, via the portion wrapper insertion utility module, the portion boundary wrapper chain into the chip design file to facilitate partial-good portion isolation test of the chip.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The term "FLIP-FLOP" or a latch is a circuit that has two stable states and can be used to store state information. A flip-flop is a bistable multivibrator. The circuit can be made to change state by signals applied to one or more control inputs and will have one or two outputs. It is the basic storage element in sequential logic. FLIP-FLOPs and latches are fundamental building blocks of digital electronics systems used in computers, communications, and many other types of systems.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-4, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
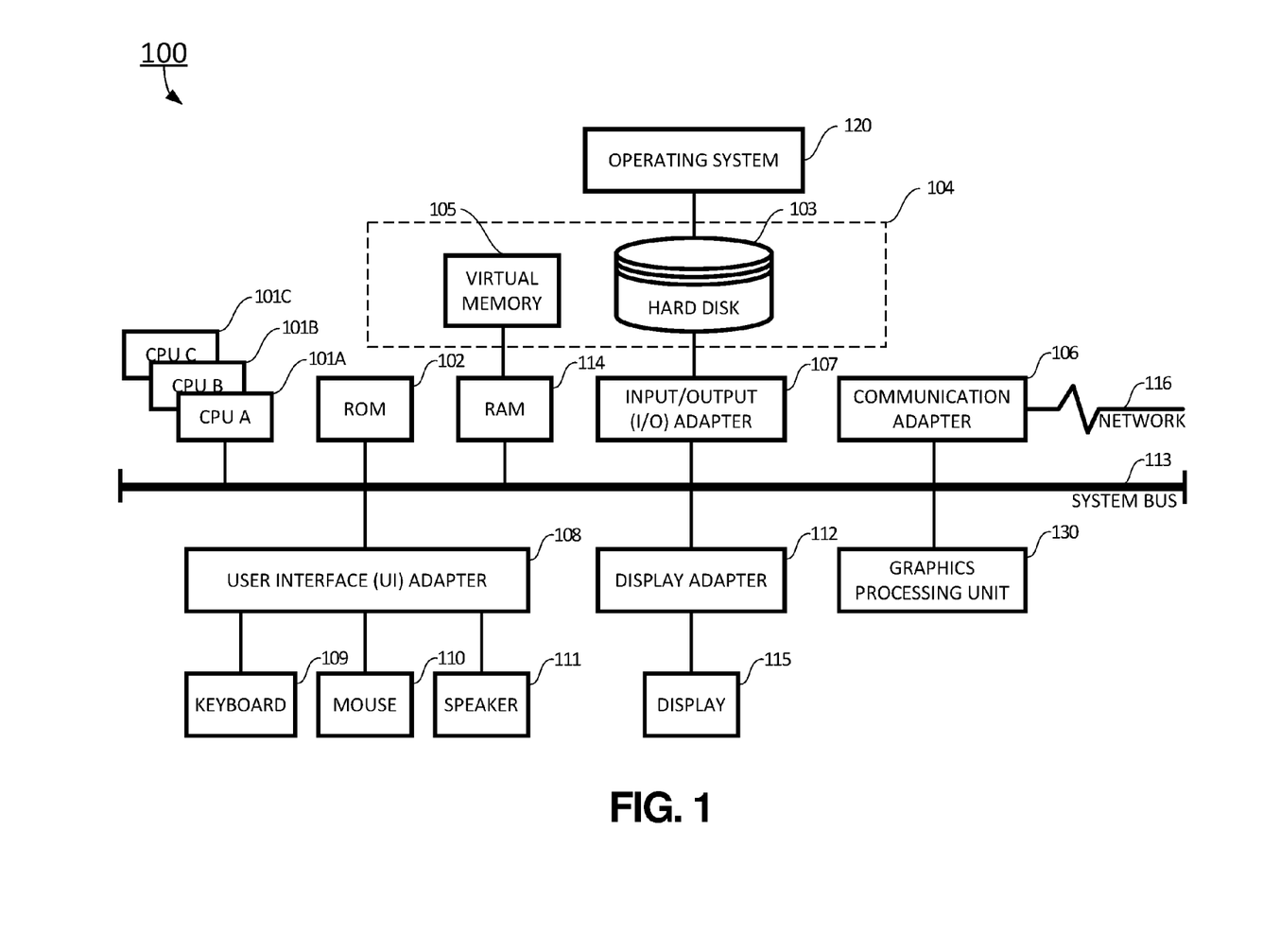
FIG. 1 is a block diagram illustrating an exemplary computer system of providing portion isolation design to a chip design to facilitate partial-good portion isolation test according to certain embodiments of the present invention.

Referring to FIG. 1, there is shown an embodiment of a computer system 100 of providing portion isolation design to a chip design to facilitate partial-good portion isolation test and implementing the teachings herein. In this embodiment, the computer system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

Hierarchical Test and Partial Good Test testing need portion wrapping to isolate a portion netlist from the logic outside its logical hierarchy. In certain embodiments, the portions may include: one or more cores, one or more partially-good cores, and one or more independent logic units. The one or more independent logic units may include register stacks, trace arrays, content addressable memories, and phase locked loops (PLL). The portion wrapper resides at the boundary of the portion and provides a way to test the portion in isolation and also the interconnection between the cores at a Top Level. Conventionally, there are 2 main existing approaches of portion wrapping for testing the portions: a dedicated boundary pulse latch for inputs and/or outputs, and a re-using the existing functional pulse latch which is getting driven by the inputs/driving the outputs. Both approaches need gating by control signals to enable testing of the portion and interconnection. A clock gating controls also need to be re-designed to control the boundary pulse latches.

If there are no dedicated pulse latches sourcing or sinking in the primary inputs and/or outputs of a portion, wrapper Pulse latches are necessary which creates hardware overhead, and techniques need to be developed to decrease this hardware overhead. Existing approaches of portion wrapping may include: dedicated pulse latches for each primary input or output of a portion, set of boundary Pulse latches or wrapper Pulse latches when the above feature not possible, and portion wrapper latches reduced by selectively providing functional and scan clocks. None of these approaches addresses logic optimization. A large number of Pulse latches causes hardware overhead. This hardware overhead may add to gating logic, chip area, leakage and active power as well.

The present disclosure provides a method of providing portion isolation design to a chip design to facilitate partial-good portion isolation test without adding hardware overhead. The portion isolation design is incorporated into the chip design.

Figure 2:
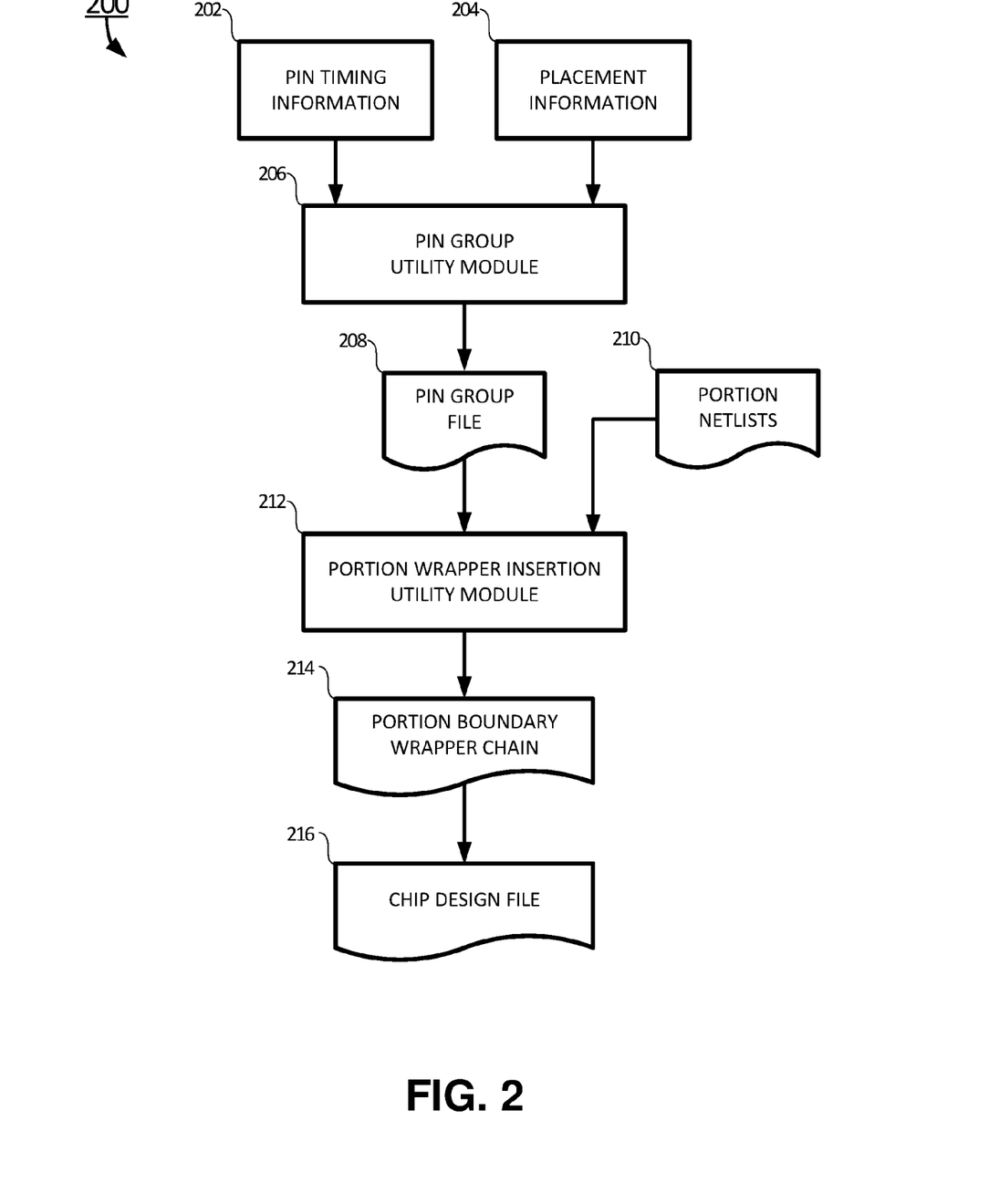
FIG. 2 is a block diagram of an exemplary processing system of providing portion isolation design to a chip design to facilitate partial-good portion isolation test according to certain exemplary embodiments of the present invention.

In one aspect, the present disclosure relates to a processing system 200 of providing portion isolation design to a chip design of a chip, as shown in FIG. 2, according to certain exemplary embodiments of the present invention. The chip may include many portions: one or more cores, one or more partial-good cores, one or more independent logic units. In certain embodiments, the one or more independent logic units may include register stacks, trace arrays, content addressable memories, and phase locked loops (PLL), or any logic units built in the chip.

In certain embodiments, the computer system may include a processor and a memory. The memory may store computer executable instructions. In certain embodiments, the computer executable instructions may include: a pin group utility module 206, and a portion wrapper insertion utility module 212.

In certain embodiments, the pin group utility module 206 is configured to groups a predetermined number of pins of a chip into a certain number of pin groups and generates a pin group file based on the pin groups. The predetermined number of pins as well as their corresponding pin related information are generated through one or more design tools, such as timing design tool and routing tools. The pins and pin related information are stored in a chip design database. When the processing system 200 starts, the pin group utility module 206 retrieved the pins and pin related information from the chip design database. In certain embodiments, the pin related information may include pin timing information 202, and placement information 204. The pin timing information 202 may include: arrival time, and timing slack. The placement information 204 may include: pin arrangement information, and pin physical layout information.

In certain embodiments, the pin group utility module 206 is configured to perform: retrieving a chip design file 216 of the chip from the chip design database, the chip design file 216 having pin related information, and generating a pin group file according to the pin related information retrieved. The pin group file generated may include one or more pin groups.

In certain embodiments, the generating may include: retrieving a pinlist of the chip from the chip design database, the pinlist having the predetermined number of pins, and initiating a grouping loop to move each of the pins on the pinlist of the chip into the one or more pin groups until the pinlist of the chip is empty. Each iteration of the grouping loop may include: moving a pin from the pinlist to one of the one or more pin groups when a placement check is enabled and when physical location of the pin is within the boundary of the pin group based on a placement affinity threshold, and moving a pin from the pinlist to one of the one or more pin groups when a timing check is enabled and when the timing check of the pin is within the boundary limit of the pin group. Once the grouping loop is completed, a pin group file 208 is created based on the one or more pin groups.

The portion wrapper insertion utility module 212 creates a portion boundary wrapper chain and inserts the portion boundary wrapper chain created into the chip design file 216 of the chip to facilitate partial-good portion isolation test of the chip. In certain embodiments, the portion wrapper insertion utility module 212 is configured to perform: combining the pin group file 208 with one or more portion netlists 210 from the chip design database to form one or more localized portion wrapper segments, stitching the one or more localized portion wrapper segments to form a portion boundary wrapper chain 214, and inserting the portion boundary wrapper chain 214 into the chip design file 216 of the chip to facilitate partial-good portion isolation test of the chip.

Figure 3:
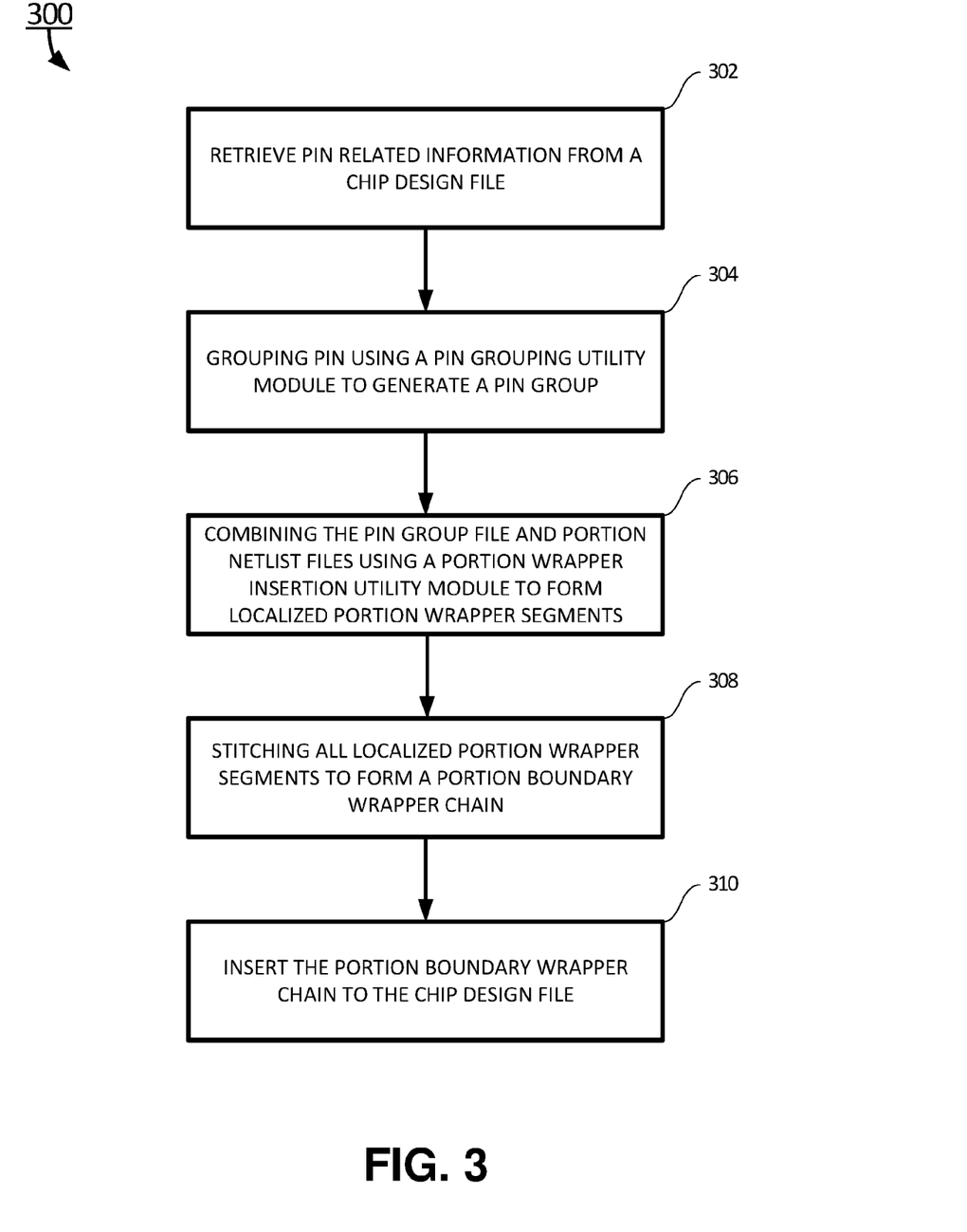
FIG. 3 is a flow chart of an exemplary method of providing portion isolation design to a chip design to facilitate partial-good portion isolation test according to certain embodiments of the present invention.

In another aspect, the present disclosure relates to a method 300 of providing portion isolation design to a chip design having a predetermined number of portions, as shown in FIGS. 2 and 3, according to certain embodiments of the present disclosure. In certain embodiments, the method 300 may include: retrieving a chip design file 216 of a chip, the chip design file 216 having pin related information from a chip design database, generating, via a pin group utility module 206, a pin group file 208 according to the pin related information retrieved, combining, via a portion wrapper insertion utility module 212, the pin group file 208 with one or more portion netlists 210 from the chip design database to form one or more localized portion wrapper segments, stitching, via the portion wrapper insertion utility module 212, the one or more localized portion wrapper segments to form a portion boundary wrapper chain 214, and inserting, via the portion wrapper insertion utility module 212, the portion boundary wrapper chain 214 into the chip design file 216 to facilitate partial-good portion isolation test of the chip.

In certain embodiments, once the portion boundary wrapper chain 214 is inserted into the chip design file 216, the portion isolation design to facilitate partial-good portion isolation test of the chip is added to the original chip design file. The chip may be made in batches according to the chip design file 216 that has the portion isolation design.

In certain embodiments, once the portion isolation design to facilitate partial-good portion isolation test of the chip is added to the original chip design file, the chip may be made based on the chip design file having the portion isolation design to facilitate partial-good portion isolation test of the chip.

In certain embodiments, the chip made according to the chip design file 216 may be tested using the portion isolation design to individually test each and every portions of the chip. The chip design having portion isolation design may reduce the hardware implementation in the Chip design and dramatically reduce the hardware overhead. The chip design having portion isolation design requires much lesser boundary pulse latches and wrapping logic. Such reductions may help in reducing congestion and routing issues.

In certain embodiments, the chip made according to the chip design file 216 with portion isolation design may include an on-chip service engine, an on-chip service engine memory, a first portion, a second portion, . . . , and N-th portion, each portion having a portion boundary wrapper chain such that each portion may be isolation tested according to the portion isolation design to facilitate partial-good portion isolation test. The chip may be tested a system functional testing device. The system functional testing device may include system functional test software, and the chip to be tested by the system functional testing device. The chip may be mounted on the system functional testing device for testing. The chip may include an on-chip service engine which is an on-chip highly optimized general purpose micro-controller. The on-chip service engine may have its own instruction set architecture (ISA), and acts as a bridge between an external tester such as a computer system and its intra-chip functional logic units. The on-chip service engine is capable of performing any chip operations that any external tester program can perform.

In certain embodiments, the on-chip service engine memory may be a volatile memory, such as the random-access memory (RAM), for storing the data and information during the operation of the system functional test. The service engine memory may also include a non-volatile data storage media for system functional test software and other applications. Examples of the service engine memory may include flash memory, memory cards, USB drives, hard drives, floppy disks, optical drives, or any other types of data storage devices.

The chip may include certain number of different portions: such as independent logic units, registers, arrays of memory, and one or more cores of a processor. The system functional test software, when executed at the on-ship service engine, may be configured to identify any of the portions of the chip to be good, not good, and the whether the chip is still functional when some of the portions are bad. With the built-in portion isolation design incorporated in the system functional test software, it is much easier for the system functional test software to identify good portions, bad portions, and/or partially good portion with less hardware overhead.

In certain embodiments, a hard disk of a computer system may store system functional test software for performing system functional test on the chip having partial-good portions with built-in portion isolation design. In certain embodiments, when the system functional test software is executed at a processor, the computer system may perform: initializing, by system functional test software, the service engine of the chip undergoing system functional test, performing, system functional test by the service engine, and completing the system functional test of the chip. Each of the "partial-good" portions is identified by a "partial-good" parameter. In certain embodiments, the initializing may include: loading the system functional test software into the service engine memory, identifying each "partial-good" portion of the chip according to the built-in portion isolation design, writing a "partial-good" parameter for each "partial-good" portion of the chip identified to a first predetermined location of the service engine memory.

In certain embodiments, the system functional test software is executed on the on-ship service engine, and each isolated portion of the chip is tested with the built-in portion isolation design to identify all good portions, bad portions, and partial-good portions of the chip. Once the good portions, bad portions, and partially good portions are identified, information of these good portions, bad portions, and partially good portions of the chip may be stored in a predetermined location of the service engine memory such that the chip made labeled and categorized in a later time of the chip production.

In certain embodiments, the portions may include one or more cores, one or more partially-good cores, and one or more independent logic units. The one or more independent logic units may include register stacks, trace arrays, content addressable memories, and phase locked loops (PLL). In certain embodiments, the pin related information may include pin timing information 202, and placement information 204. The pin timing information 202 may include: arrival time, and timing slack. The placement information 204 may include: pin arrangement information, and pin physical layout information.

In certain embodiments, the generating may include: retrieving a pinlist of the chip from the chip design database, the pinlist having a predetermined number of pins, initiating a grouping loop to move each of the pins on the pinlist of the chip into one or more pin groups until the pinlist of the chip is empty, and generating the pin group file 208 based on the one or more pin groups. Each iteration of the grouping loop may include: moving a pin from the pinlist to one of the one or more pin groups when a placement check is enabled and when physical location of the pin is within the boundary of the pin group based on a placement affinity threshold, and moving a pin from the pinlist to one of the plurality of pin groups when a timing check is enabled and when the timing check of the pin is within the boundary limit of the pin group.

Referring now to FIG. 3, a flow chart of an exemplary method 300 of providing portion isolation design to a chip design to facilitate partial-good portion isolation test according to certain embodiments of the present invention.

At block 302, the pin group utility module 206 may retrieve a list of pins on the chip (pinlist) and their corresponding pin related information. In certain embodiments, the chip may include a predetermined number of pins on this pinlist. In certain embodiments, the pin related information may include pin timing information 202, and placement information 204. The pin timing information 202 may include: arrival time, and timing slack. The placement information 204 may include: pin arrangement information, and pin physical layout information.

At block 304, the pin group utility module 206 may group the predetermined number of pins on the pinlist into one or more pin groups and generate the pin group file 208. Detailed grouping operations will be described in FIG. 4.

At block 306, the portion wrapper insertion utility module 212 may combine the pin group file 208 and one or more portion netlists from the chip design database to form one or more localized portion wrapper segments.

At block 308, the portion wrapper insertion utility module 212 may stitch the one or more localized portion wrapper segments to form the portion boundary wrapper chain 214. The portion boundary wrapper chain 214 contains the portion isolation design to the chip design to facilitate partial-good portion isolation test of the chip.

At block 310, the portion wrapper insertion utility module 212 may insert the portion boundary wrapper chain 214 into the chip design file 216 to provide the portion isolation design to the chip design to facilitate partial-good portion isolation test of the chip.

Figure 4:
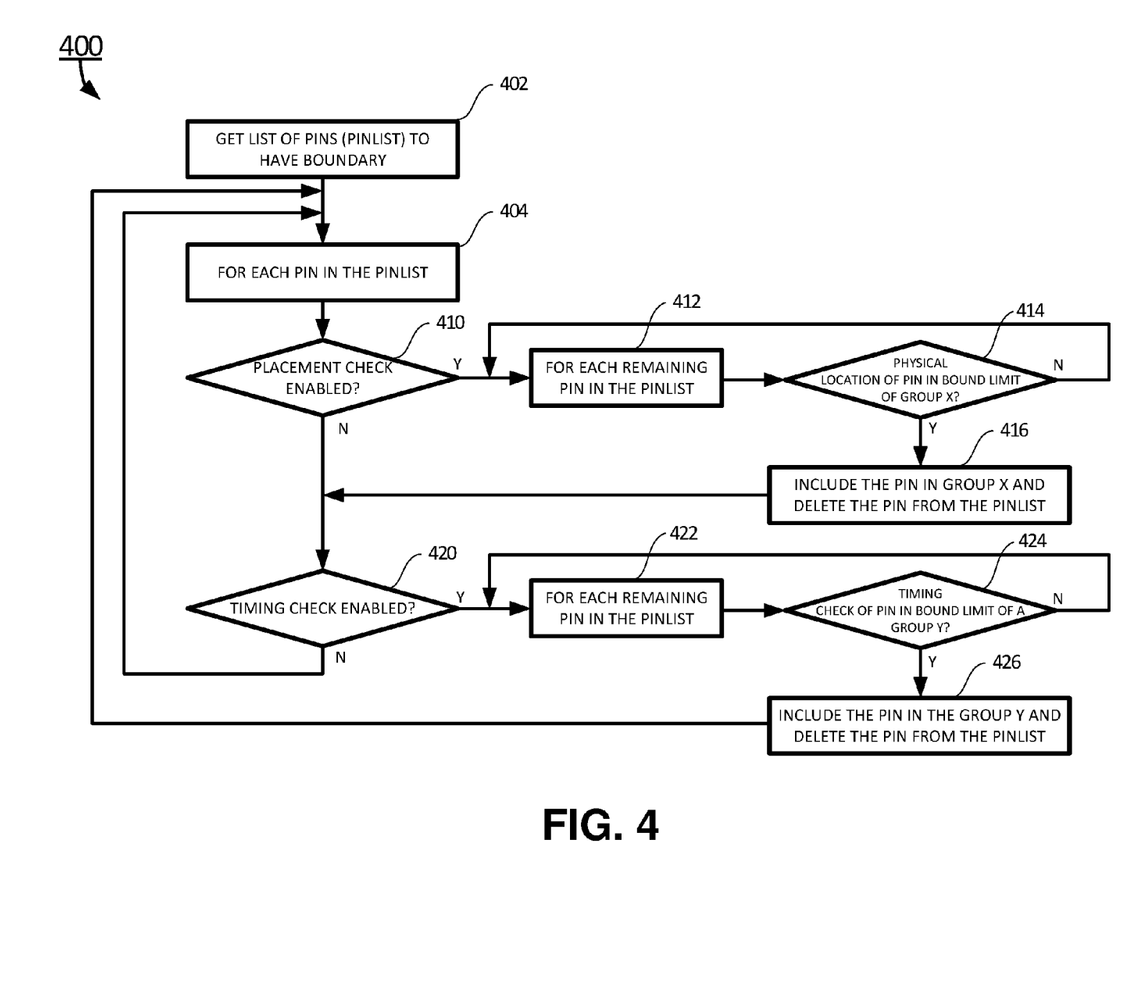
FIG. 4 is a flow chart showing how the pins in a pinlist are grouped to form a pin group file according to certain exemplary embodiments of the present invention.

Referring now to FIG. 4, a flow chart showing how the predetermined pins in the pinlist are grouped (block 304) to form the pin group file 208 is shown according to certain exemplary embodiments of the present invention.

At block 402, the pin group utility module 206 may get the list of the predetermined number of pins (the pinlist) from the chip design database.

At block 404, the pin group utility module 206 may perform following two separate loops to each of the predetermined number of pins of the chip on the pinlist. The two loops may include a placement loop having block 410 through block 416, and a timing loop having block 420 through block 426.

At query block 410, the pin group utility module 206 may check whether a placement check is enabled. When the placement check is not enabled, the placement loop having block 410 through block 416 is skipped. Otherwise, the placement loop is executed.

At block 412, the pin group utility module 206 may go through the placement check to each and every one of the pins remaining on the pin list.

At query block 414, the pin group utility module 206 may check whether the physical location of the pin is in the boundary limit of a pin group X, where pin group X is one of the one or more pin groups. When the physical location of the pin is in the boundary limit of the pin group X, then move the pin to pin group X at block 416. Otherwise, the pin group utility module 206 may loop back to block 412 to group the next pin remaining on the pinlist.

At block 416, the pin group utility module 206 may include the pin in the pin group X, and then remove the pin from the pinlist. Afterward, the pin group utility module 206 goes to block 420 to perform timing check.

At query block 420, the pin group utility module 206 may check whether a timing check is enabled. When the timing check is not enabled, the timing loop having block 420 through block 426 is skipped. Otherwise, the timing loop is executed.

At block 422, the pin group utility module 206 may go through the timing check to each and every one of the pins remaining on the pin list.

At query block 424, the pin group utility module 206 may perform a timing check to see whether the timing check of the pin is within the boundary limit of a pin group Y, where pin group Y may be a different pin group of the one or more pin groups. When the timing check of the pin is within the boundary limit of a pin group Y, then the pin group utility module 206 may move the pin to pin group Y at block 426. Otherwise, the pin group utility module 206 may loop back to block 422 to group the next pin remaining on the pinlist.

At block 426, the pin group utility module 206 may include the pin in the pin group Y, and then remove the pin from the pinlist. Afterward, the pin group utility module 206 goes to block 404 to group the next pin on the pinlist, until the pin list is empty.

In yet another aspect, the present disclosure relates to a computer program product operable on a processing system of providing portion isolation design to a chip design having a predetermined number of portions. The computer program product may include a non-transitory computer storage medium readable by the computer system having a processor and a memory configured to store computer executable instructions for execution by the processor of the computer system for performing a method. The method may include: retrieving a chip design file of a chip, the chip design file having pin related information from a chip design database, generating, via a pin group utility module, a pin group file according to the pin related information retrieved, combining, via a portion wrapper insertion utility module, the pin group file with one or more portion netlists to form one or more localized portion wrapper segments, stitching, via the portion wrapper insertion utility module, the one or more localized portion wrapper segments to form a portion boundary wrapper chain, and inserting, via the portion wrapper insertion utility module, the portion boundary wrapper chain into the chip design file to facilitate partial-good portion isolation test.

In certain embodiments, the generating may include: retrieving a pinlist of the chip from the chip design database having a predetermined number of pins, initiating a grouping loop to move each of the pins on the pinlist of the chip into a plurality of pin groups until the pinlist of the chip is empty, and generating the pin group file based on the plurality of pin groups. Each iteration of the grouping loop may include: moving a pin from the pinlist to one of the pin groups when a placement check is enabled and when physical location of the pin is within the boundary of the pin group based on a placement affinity threshold, and moving a pin from the pinlist to one of the plurality of pin groups when a timing check is enabled and when the timing check of the pin is within the boundary limit of the pin group.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing portion isolation design to a chip design having a plurality of portions, comprising:
   retrieving, by a processor, a chip design file of a chip, wherein the chip design file comprises pin related information from a chip design database;
   generating, by the processor, a pin group file according to the pin related information retrieved;

combining, by the processor, the pin group file with one or more portion netlists to form one or more localized portion wrapper segments;

stitching, by the processor, the one or more localized portion wrapper segments to form a portion boundary wrapper chain;

inserting, by the processor, the portion boundary wrapper chain into the chip design file of the chip to facilitate partial-good portion isolation test of the chip;

inserting, by the processor, an on-chip service engine into the chip design file of the chip;

causing, by the processor, the chip to be fabricated utilizing the chip design file;

storing, in the on-chip service engine, system functional test software.

2. The method of claim 1, wherein the plurality of portions comprises:

one or more cores;

one or more partially-good cores;

one or more independent logic units, wherein the one or more independent logic units comprise register stacks, trace arrays, content addressable memories, and phase locked loops (PLL).

3. The method of claim 1, wherein the pin related information comprises:

pin timing information; and placement information.

4. The method of claim 3, wherein the pin timing information comprises:

arrival time; and timing slack.

5. The method of claim 3, wherein the placement information comprises:

pin arrangement information; and pin physical layout information.

6. The method of claim 1, wherein the generating comprises:

retrieving a pinlist of the chip from the chip design database, wherein the pinlist comprises a plurality of pins;

initiating a grouping loop to move each of the plurality of pins on the pinlist of the chip into a plurality of pin groups until the pinlist of the chip is empty; and generating the pin group file based on the plurality of pin groups.

7. The method of claim 6, wherein each iteration of the grouping loop comprises:

moving a pin from the pinlist to one of the plurality of pin groups when a placement check is enabled and when physical location of the pin is within the boundary of the pin group based on a placement affinity threshold; and moving a pin from the pinlist to one of the plurality of pin groups when a timing check is enabled and when the timing check of the pin is within a boundary limit of the pin group.

8. A computer program product operable on a processing system of providing portion isolation design to a chip design having a plurality of portions, comprising a non-transitory computer storage medium readable by the processing system having a processor and a memory configured to store computer executable instructions for execution by the processor of the processing system for performing a method comprising:

retrieving a chip design file of a chip, wherein the chip design file comprises pin related information from a chip design database;

generating, via the processor, a pin group file according to the pin related information retrieved;

combining, via the processor, the pin group file with one or more portion netlists to form one or more localized portion wrapper segments;

stitching, via the processor, the one or more localized portion wrapper segments to form a portion boundary wrapper chain;

inserting, via the processor, the portion boundary wrapper chain into the chip design file of the chip to facilitate partial-good portion isolation test of the chip;

inserting, by the processor, an on-chip service engine into the chip design file of the chip;

causing, by the processor, the chip to be fabricated utilizing the chip design file;

storing, in the on-chip service engine, system functional test software.

9. The computer program product of claim 8, wherein the plurality of portions comprises:

one or more cores;

one or more partially-good cores;

one or more independent logic units, wherein the one or more independent logic units comprise register stacks, trace arrays, content addressable memories, and phase locked loops (PLL).

10. The computer program product of claim 8, wherein the pin related information comprises:

pin timing information, wherein the pin timing information the pin timing information comprises: arrival time, and timing slack.

11. The computer program product of claim 10, wherein the pin timing information comprises placement information, wherein the placement information comprises: pin arrangement information, and pin physical layout information.

12. The computer program product of claim 8, wherein the generating comprises:

retrieving a pinlist of the chip from the chip design database, wherein the pinlist comprises a plurality of pins;

initiating a grouping loop to move each of the plurality of pins on the pinlist of the chip into a plurality of pin groups until the pinlist of the chip is empty; and generating the pin group file based on the plurality of pin groups.

13. The computer program product of claim 12, wherein each iteration of the grouping loop comprises:

moving a pin from the pinlist to one of the plurality of pin groups when a placement check is enabled and when physical location of the pin is within the boundary of the pin group based on a placement affinity threshold; and moving a pin from the pinlist to one of the plurality of pin groups when a timing check is enabled and when the timing check of the pin is within a boundary limit of the pin group.

* * * * *